United States Patent Office 3,248,359
Patented Apr. 26, 1966

3,248,359
POLYOLEFIN COMPOSITIONS
Daniel Edwin Maloney, Wilmington, Del., assignor to E. I. du Pont de Nemours and Company, Wilmington, Del., a corporation of Delaware
No Drawing. Filed Apr. 27, 1961, Ser. No. 105,857
8 Claims. (Cl. 260—41)

This application is a continuation-in-part of Serial No. 1,847, filed January 12, 1960.

The present invention relates to polyolefin compositions, and, more particularly, to modified polyolefin compositions having improved processability and improved stress-crack resistance.

The present invention is directed to the high molecular weight resins obtained by the polymerization of terminally unsaturated monoolefins. Representative examples of such polyolefins are low and high density polyethylene, polypropylene and copolymers of ethylene with such monomers as propylene, butene, octene, decene and vinyl cyclohexene. These polyolefins are generally obtained either through polymerization with a free radical catalyst, or through polymerization with an organometallic catalyst, often referred to as a "coordination catalyst." The molecular weights of high molecular weight polyolefins range from about 2000 to about 40,000 and higher. These polyolefins, furthermore, are characterized by inherent flexibility, corrosion resistance, weatherability, and outstanding dielectric properties; and, because of these properties, the polyolefins are particularly valuable in numerous commercial applications. In many applications the polyolefins are employed in stressed conditions. This is particularly true in the use of polyolefins for wire and cable coating and jacketing. In this stressed condition, polyolefins fail significantly more readily than in the unstressed conditions. This is particularly true when the stressed polyolefin is contacted with surface-active agents which include soaps, detergents, alcohols, polyglycol ethers, silicones and various other aliphatic and aromatic hydrocarbons. In general, this phenomenon is referred to as environmental stress-cracking and has been a real problem in the commercial development of polyolefins.

It is, therefore, one of the objects of the present invention to provide improved polyolefin compositions. It is another object of the present invention to provide polyolefin compositions which are improved in their environmental stress-crack resistance. Another object of the present invention is to improve the processability of polyolefins. Other objects will become apparent hereinafter.

The objects of the present invention are accomplished by a homogeneously blended polyolefin composition comprising a polyolefin containing from 1 to 50% by weight of said polyolefin, and preferably from 1 to 15% by weight of said polyolefin, of an ethylene copolymer wherein the comonomer is a compound capable of copolymerizing with the ethylene and forms a copolymer having polar groups directly attached to the polymer chain, the ratio of the ethylene to said comonomer in the copolymer varying from 1:1 to 30:1, the molecular weight of the copolymer being sufficiently high to give the copolymer a melting point above 70° C.

Comonomers which results in copolymers having polar groups attached to the carbon chain of the molecule are such compounds as carbon monoxide, vinyl acetate, vinyl alcohol, vinyl ethers, unsaturated acids and similar compounds. A preferred class of comonomers are those which contain oxygen in the polar group and which contain not more than two carbon atoms in the polar group attached to the polymer chain. The preparation of these copolymers, having the desired ratio of comonomers and the desired molecular weight, is well known in the art, and, therefore, not described in great detail here. In general, these copolymers are formed by the copolymerization of ethylene and a suitable polar group containing comonomer at elevated temperatures using a free radical catalyst, such as a peroxide, in the presence or absence of an aqueous phase. Certain copolymers employed in the process of the present invention require an additional processing step after polymerization, such as the preparation of copolymers of ethylene and vinyl alcohol, which are only obtained on hydrolysis of ethylene/vinyl acetate copolymers.

The polyolefins stabilized by the process of the present invention are obtained through the polymerization of an olefin having the general formula $CH_2=CHR$, where R may be a hydrogen or a hydrocarbon radical. The hydrocarbon radical may be aliphatic, cycloaliphatic or aromatic in nature. They are high molecular weight polymers suitable as plastics which generally have molecular weights, as determined by melt index, ranging from 0.01 to 35. Employing the recently developed coordination catalyst, there appears to be little or no limitation on the size of the hydrocarbon radical in the monomer in obtaining high molecular weight polymer. However, from a commercial standpoint, the polyolefins are generally limited to monomers containing less than 20 carbon atoms. The polyolefin class includes copolymers of these olefins with one or more other monomers. These copolymers may be made in any range of comonomer concentration. Although the improvement discovered in accordance with the present invention is applicable to all polyolefins, it is particularly significant with such polymers as polyethylenes, polypropylene, and copolymers of ethylene with terminally unsaturated olefins containing more than 50% of ethylene.

The polyolefin compositions employed in the present invention may also include, in addition to the above modifiers, other additives which are employed to plasticize, lubricate, prevent oxidation or lend color to the polyolefin. Such additives are known and may be incorporated without appreciably affecting the advantageous results obtained by the present invention.

The resistance to environmental stress cracking is measured by a technique described in the book "Polyethylene" by Raff and Allison, published by Interscience Publishers, on pages 389 to 393. Principally, the method comprises cutting a slit into ten specimens and bending these specimens into a U-shape with the slit on the outside, and, while so stressed, placing the specimens into a surface-active agent. The surface-active agent employed generally is Igepal CA, an alkyl aryl polyethylene glycol ether manufactured by General Dyestuff Corporation. The measurement which determines the resistance to stress-cracking is the time required for 50% of the stressed samples to fail. In many instances it was found that Igepal CA did not produce cracking of the stressed samples rapidly enough to allow significant measurements. Hence, the measurement of environmental stress-crack resistance was also carried out in Hostapal using the same procedure. Hostapal, similarly, is a detergent comprising an ethylene glycol phenol condensation product, and is also commercially available. A more severe test was also formulated by exposing the stressed samples to a temperature of 70° C. in an air oven for 7 days, and thereafter submerging the stressed sample in a detergent such as Igepal AC or Hostapal. Improvement in processability is measured by various methods. One method comprises the measurement of the stress exponent "$n$" and the measurement of the processability index "$C$." An increase in either "$n$" or "$C$" measures an improvement in flow of the polyolefin. The stress exponent "$n$" is defined as $$n = \log\frac{\alpha_2}{\alpha_1} \times \frac{\sigma_1}{\sigma_2}$$

where $\gamma_1$ is the shear rate at 2160 g. loading of a melt indexer, $\gamma_2$ is the shear rate at 6480 g. loading of the melt indexer, $\sigma_1$ is the shear stress at 2160 g. loading of the melt indexer, and $\sigma_2$ is the shear stress at 6480 g. loading of the melt indexer. The processability index is defined as $$C = MI \times \frac{10^{2.5n}}{10^3}$$

where $n$ is the stress exponent and MI the melt index. The measurement of melt index and the indexer used herein are described in detail in ASTM-D-1238-52 T. The improvement in processability is also manifested by a lowering of head pressure and power requirements in melt extruders, such as are used in applying insulation to wire and cable. Another method of measuring the improvement in processability is to measure the maximum extrusion speed permissible for acceptable wire coatings or to measure the surface roughness of the extruded wire made at a particular speed.

Various methods may be employed to obtain the compositions of the present invention. Thus, the novel polyolefins of the present invention may be prepared by milling a physical mixture of the two components on a rubber mill at temperatures above the melting point of the polyolefin, by banburying a mixture of the two components, by dissolving both in a common solvent and then precipitating and separating the mixture, and by melt extruding a dry blended mixture of the polyolefin and the additive. The methods used in incorporating additives into polyolefins have been described in the art, and, since they are not critical, are here not disclosed in any substantial detail.

The present invention is further illustrated by the experimental data described and listed in the tables below. The novel compositions illustrated in these tables were generally prepared by drying tumbling finely divided polyolefin and finely divided copolymer additive and extruding the resultant mixture through a two inch "Egan" extruder at a temperature of 170 to 220° C., using either a typical nylon extrusion screw or a mixing torpedo in the extruder. In each instance where the tables show an unmodified polyolefin for comparative purposes, the data listed was obtained from a polyolefin which had been worked in the same way as the modified polyolefins.

Compositions prepared in this manner were tested in respect to their environmental stress crack-resistance using the more severe test method described above, involving heat aging of the samples. Table I describes the results obtained from various polyolefins employing as an additive an ethylene carbon monoxide copolymer in various concentrations. The carbon monoxide copolymer employed had a melt index of approximately 500 to 1000 dg./min. and a melting point of approximately 97° C. As can be seen from the results, a significant improvement in environmental-stress crack resistance results when the ethylene/carbon monoxide copolymer is employed as an additive in either polyethylene or copolymers of ethylene with monoolefins.

*Table I*

| Polymer | Percent E/CO copolymer | E/CO ratio | Melt index in dg./min. (ASTM-D-1238-52-T) | Density in g./cc. ASTM-D-792 | Environmental stress crack resistance after 7 days aging, in hours | |
|---|---|---|---|---|---|---|
| | | | | | In "Igepal" CA | In "Hostapal" |
| Polyethylene | | | 0.30 | 0.917 | 30 | 1.75 |
| Do | 5 | 3.5 | 0.30 | 0.920 | >360 | 3 |
| Do | 10 | 3.5 | 0.21 | 0.923 | | 6 |
| Do | 5 | 3.8 | 0.15 | | | 30 |
| Polyethylene and polyethylene wax | | | 0.23 | | | 0.75 |
| Ethylene/butene copolymer 97:3 | | | 1.87 | 0.937 | 35 | |
| Do | 5 | 3.5 | 2.33 | 0.941 | 60 | |

The improvement in processability is demonstrated by the results listed in Table II. Compositions were prepared from two branched polyethylenes, A and B, having a density of 0.92 g./cc. with varying concentrations of the ethylene/carbon monoxide copolymer, and with copolymers varying in their comonomer ratio. The copolymers employed had substantially the characteristics of those used in obtaining the results in Table I. The stress exponent "$n$" and the processability index "$C$" were measured and calculated as described hereinabove. These polymers were then employed to coat number 22 gauge wire at 600 ft./min. employing a 1½ inch N.R.M. extruder using a conventional pressure type die. The polymer melt when emerging from the die was at a temperature of 220 to 225° C. Both barrel and die were maintained at a temperature of approximately 245° C. The pressure at the exit end of the barrel and the power necessary to rotate the screw of the barrel were measured. The results listed indicate the substantial improvement in processability resulting from the addition of the ethylene/carbon monoxide copolymer.

*Table II*

| Polymer | Percent E/CO copolymer | E/CO ratio | Melt index in dg./min. | Stress exponent "$n$" | Processability index "$C$" | Head pressure, in p.s.i.g. | Power, in watts |
|---|---|---|---|---|---|---|---|
| Polyethylene A | 0 | | 0.20 | 1.86 | 9 | 3,150 | 1,800 |
| Do | 1 | 4 | 0.23 | 1.88 | 11.5 | 3,100 | 1,680 |
| Do | 2.5 | 4 | 0.23 | 1.88 | 11.5 | 3,050 | 1,660 |
| Do | 5 | 4 | 0.26 | 1.92 | 16.4 | 2,900 | 1,650 |
| Do | 7.5 | 4 | 0.26 | 1.90 | 14.6 | 2,775 | 1,570 |
| Do | 10 | 4 | 0.21 | 1.93 | 14.2 | 2,725 | 1,475 |
| Polyethylene B | 0 | | 0.23 | | | 3,375 | |
| Do | 5 | 3.5 | 0.17 | | | 3,175 | |
| Do | 5 | 3.8 | 0.20 | | | 3,250 | |
| Do | 5 | 6.1 | 0.20 | | | 3,275 | |
| Do | 5 | 7.8 | 0.21 | | | 3,300 | |

Improvement of processability resulting from the addition of ethylene/carbon monoxide copolymers is further illustrated in Table III where surface roughness of coated wire obtained from polyolefins with and without the described ethylene/carbon monoxide copolymer is compared. The coated wire was obtained by using the same extrusion conditions and machinery as described for the results on coated wire in Table II. The surface quality measurements were made by using a Brush "Surfindicater." Again, a substantial improvement in the quality of the wire coating is apparent.

Table III

| Polymer | Percent E/CO copolymer | E/CO ratio | Melt index in dg./min. | Roughness in microinches |
|---|---|---|---|---|
| Ethylene/butene copolymer, 97:3 | 0 | | 1.83 | 152 |
| Do | 0 | | 2.63 | 146 |
| Do | 10 | ~4 | 2.33 | 57 |
| Polypropylene | 0 | | 0.33 | 32 |
| Do | 5 | ~4 | 0.40 | 17 |

The improvement in stress crack resistance and processability obtained by the addition of an ethylene/vinyl acetate copolymer to polyethylene is demonstrated by Table IV showing percentage of ethylene/vinyl acetate copolymer added, the melt index of the resulting polymer blend, the head pressure observed in the extrusion coating of wire, and the stress crack resistance as measured on samples of the blend which had been exposed to 70° C. temperature in air for seven days in "Hostapal." The ethylene/vinyl acetate copolymer employed in the formation of the blend giving rise to the data presented in Table IV was a copolymer having a melt index of about 1.8 dg./min., a melting point of about 110° C. and contained 15% of vinyl acetate. The test procedures employed were the same as employed in the determination of the data listed in the preceding tables.

Table IV

| Polymer | Percent E/VA copolymer | Melt index in dg./min. | Head Pressure at 600 ft./min. in p.s.i.g. | Stress crack resistance after 7 days aging/hours |
|---|---|---|---|---|
| Polyethylene | 0 | 0.23 | 3,400 | <1 |
| Do | 5 | 0.27 | 3,250 | 1.5 |

Substitution of the ethylene carbon monoxide and ethylene vinyl acetate copolymer by an ethylene/vinyl methyl ether copolymer containing 20% of vinyl methyl ether, an ethylene dimethyl fumarate copolymer containing 18% of dimethyl fumarate, an ethylene vinyl alcohol copolymer containing 35% of vinyl alcohol, and a copolymer of ethylene and methyl acrylate containing 15% of methyl acrylate shows the same type of improvements in stress crack-resistance and processability as shown in the preceding tables.

In Table V a comparison of stiffness and stress crack resistance is given for a blend of high density polyethylene, a density of 0.96 g./cc. and a melt index of 0.8 dg./min. with an ethylene/vinyl acetate copolymer having an ethylene to vinyl acetate mole ratio of 21, a melt index of 0.8 dg./min. and a melting point of about 110° C., and two commercially available high density polyethylenes.

Table V

| Resin | Density, g./cc. | Melt index [1] | Stiffness [2] p.s.i. | Stress crack resistance $F_{50}$ hours [3] |
|---|---|---|---|---|
| 10% Ethylene vinyl acetate copolymer 90% polyethylene | | 0.86 | 105,000 | 17 |
| Polyethylene | .95 | 0.31 | 93,000 | 5 |
| Polyethylene (used in blend) | .96 | 0.8 | 110,000 | 5 |

[1] ASTM-D-1238-57T in dg./min.
[2] ASTM-D-747-58T.
[3] ASTM-D-1693 modified in that the test was carried out in "Joy" detergent without annealing the samples for one hour.

As can be seen from the data, the stress crack-resistance of the blend is greatly improved over that obtained for the unmodified polyethylene. Additionally the blend also gives the best combination of stress crack-resistance and stiffness.

In Table VI a comparison of stiffness and stress crack resistance is given for blends of low density polyethylene and an ethylene methacrylic acid copolymer having an ethylene to methacrylic acid mole ratio of 16, a melt index of 150 dg./min. and also a blend of the same polyethylene with an ethylene vinyl acetate copolymer having an ethylene to vinyl acetate ratio of 7 and a melt index of 12.

Table VI

| Composition | Melt index [1] in dg./min. | Density, in g./cc. | Stress crack resistance | |
|---|---|---|---|---|
| | | | $F_0$ | $F_{30}$ [2] |
| 5% ethylene methacrylic acid copolymer-95% polyethylene | 0.3 | 0.918 | 168 | 168 |
| 10% ethylene methacrylic acid copolymer | 0.4 | 0.919 | 168 | 168 |
| 10% ethylene vinyl acetate copolymer-95% polyethylene | 0.3 | 0.920 | 168 | 168 |
| Polyethylene (used in blend) | 0.3 | 0.917 | 2 | 19 |

[1] ASTM-D-1238-57T.
[2] ASTM-D-1693 modified in that "Hostapal" was used instead of "Igepal".

The experimental results illustrated in the tables are characteristic of the nature of the improvement obtained by the compositions of the present invention. Polyolefin compositions prepared from such polyolefins as polybutene, and other copolymers of ethylene and monoolefin, have been found to exhibit substantially the same improvement in stress crack resistance and processability when combined with copolymer additives of the type described above, in the concentrations described above. Similarly, the specific nature of the polar group does not affect the ability of the copolymer to improve the stress crack resistance and processability of the polyolefin. The invention is, therefore, not to be construed as being limited to the experimental data presented in the tables.

The compositions prepared by the process of the present invention are useful in the molding of solid shapes, in the extrusion of film, fibers, tubing and pipe, but are of particular utility in the coating of wires and cables. Standard polyolefin fabrication methods can be suitably employed with the compositions of the present invention.

I claim:

1. A composition of matter comprising a homogeneous blend of a polyolefin and from 1 to 15% by weight of the polyolefin, of a solid copolymer of ethylene and carbon monoxide, wherein the ratio of ethylene to carbon monoxide varies from 1:1 to 30:1.

2. The composition of matter set forth in claim 1 wherein the polyolefin is polyethylene.

3. The composition set forth in claim 1 wherein the polyolefin is a copolymer of ethylene and a comonomer having the general formula $RCH_2=CH_2$ wherein R is an aliphatic hydrocarbon radical.

4. The composition set forth in claim 1 wherein the polyolefin is polypropylene.

5. The composition as set forth in claim 1 containing a carbon black additive.

6. The composition set forth in claim 1 containing an antioxidant additive.

7. The composition set forth in claim 1 in film form.

8. The composition set forth in claim 1 in funicular form.

References Cited by the Examiner

UNITED STATES PATENTS

| | | | |
|---|---|---|---|
| 2,448,666 | 9/1948 | Fletcher | 260—897 |
| 2,541,987 | 2/1951 | Cramer | 260—897 |
| 2,628,214 | 2/1953 | Pinkey et al. | 260—41 |
| 2,953,541 | 9/1960 | Pecha | 260—33.4 |

FOREIGN PATENTS 582,093   11/1946   Great Britain.

MURRAY TILLMAN, *Primary Examiner.*

LEON J. BERCOVITZ, *Examiner.*